US011546768B2

(12) United States Patent
Chen et al.

(10) Patent No.: US 11,546,768 B2
(45) Date of Patent: Jan. 3, 2023

(54) APPLICATION DOWNLOAD MONITORING METHOD AND DEVICE

(71) Applicant: Huawei Technologies Co., Ltd., Shenzhen (CN)

(72) Inventors: Zhongxian Chen, Shenzhen (CN); Xianjun Zou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 289 days.

(21) Appl. No.: 16/479,803

(22) PCT Filed: Jun. 26, 2017

(86) PCT No.: PCT/CN2017/090077
§ 371 (c)(1),
(2) Date: Jul. 22, 2019

(87) PCT Pub. No.: WO2018/133326
PCT Pub. Date: Jul. 26, 2018

(65) Prior Publication Data
US 2020/0210579 A1   Jul. 2, 2020

(30) Foreign Application Priority Data
Jan. 22, 2017   (CN) .......................... 201710057618.5

(51) Int. Cl.
*H04W 12/128*       (2021.01)
*G06F 8/60*         (2018.01)
(Continued)

(52) U.S. Cl.
CPC ............ *H04W 12/128* (2021.01); *G06F 8/60* (2013.01); *G06F 21/566* (2013.01);
(Continued)

(58) Field of Classification Search
CPC ....... H04W 12/128; H04W 12/35; G06F 8/60; G06F 21/566; G06F 21/572; G06F 2221/033; G06Q 50/265
See application file for complete search history.

(56) References Cited

U.S. PATENT DOCUMENTS

| 2003/0055924 A1 | 3/2003 | Matsugatani |
| 2011/0047620 A1 | 2/2011 | Mahaffey et al. |

(Continued)

FOREIGN PATENT DOCUMENTS

| CN | 101924760 A | 12/2010 |
| CN | 102946377 A | 2/2013 |

(Continued)

OTHER PUBLICATIONS

Machine Translation and Abstract of Chinese Publication No. CN102946377, Feb. 27, 2013, 7 pages.

(Continued)

*Primary Examiner* — Ashokkumar B Patel
*Assistant Examiner* — William B Jones
(74) *Attorney, Agent, or Firm* — Conley Rose, P.C.

(57) ABSTRACT

This application provides an application download monitoring method and a device. A mobile terminal detects whether access URL information requested by a plurality of first applications includes an application download request; when detecting that access URL information requested by any one of the plurality of first applications includes an application download request, the mobile terminal blocks the application download request, and sends the URL information to a server; the server queries, based on the application download request in the URL information, whether a security analysis result of a second application corresponding to the application download request exists, and if finding the security analysis result, the server sends the security (Continued)

analysis result to the mobile terminal; and the mobile terminal determines, based on the security analysis result, whether to download the second application.

20 Claims, 13 Drawing Sheets

(51) Int. Cl.
*G06F 21/56* (2013.01)
*G06F 21/57* (2013.01)
*G06Q 50/26* (2012.01)

(52) U.S. Cl.
CPC ...... *G06F 21/572* (2013.01); *G06F 2221/033* (2013.01); *G06Q 50/265* (2013.01)

(56) References Cited

U.S. PATENT DOCUMENTS

| | | | | |
|---|---|---|---|---|
| 2011/0185436 | A1* | 7/2011 | Koulinitch | H04L 63/10 726/28 |
| 2016/0125185 | A1* | 5/2016 | Wang | G06F 21/552 726/23 |
| 2016/0269433 | A1 | 9/2016 | Jiang et al. | |
| 2016/0321452 | A1* | 11/2016 | Richardson | H04W 12/37 |

FOREIGN PATENT DOCUMENTS

| | | |
|---|---|---|
| CN | 103442361 A | 12/2013 |
| CN | 104123163 A | 10/2014 |
| CN | 104253791 A | 12/2014 |
| CN | 104378345 A | 2/2015 |
| CN | 104424430 A | 3/2015 |
| CN | 105791323 A | 7/2016 |
| CN | 104318153 B | 6/2017 |
| EP | 3016424 A1 | 5/2016 |

OTHER PUBLICATIONS

Machine Translation and Abstract of Chinese Publication No. CN103442361, Dec. 11, 2013, 17 pages.
Machine Translation and Abstract of Chinese Publication No. CN104318153, Jul. 23, 2017, 10 pages.
Foreign Communication From a Counterpart Application, Chinese Application No. 17892322.3, Extended European Search Report dated Sep. 27, 2019, 7 pages.
Foreign Communication From a Counterpart Application, PCT Application No. PCT/CN2017/090077, English Translation of International Search Report dated Aug. 21, 2017, 2 pages.
Foreign Communication From a Counterpart Application, PCT Application No. PCT/CN2017/090077, English Translation of Written Opinion dated Aug. 21, 2017, 3 pages.

* cited by examiner

APPLICATION DOWNLOAD MONITORING METHOD AND DEVICE

CROSS-REFERENCE TO RELATED APPLICATIONS

This application is a national stage of International Application No. PCT/CN2017/090077, filed on Jun. 26, 2017, which claims priority to Chinese Patent Application No. 201710057618.5, filed on Jan. 22, 2017. Both of the aforementioned applications are hereby incorporated by reference in their entireties.

TECHNICAL FIELD

This application relates to the field of electronic technologies, and in particular, to an application download monitoring method and a device.

BACKGROUND

The mobile Internet is an open system. When browsing a web page or news on a mobile phone, a user may be misled to download some malicious software, thereby compromising user security. In the prior art, download detection and control are usually performed within an application. For example, a browser App (application, Application) detects a link clicked by a user, pops up a prompt box for user confirmation if finding that the link is a download link, and guides the user to a more secure download link.

However, download detection within a single application lacks generality. This solution cannot resolve the problem when many software development kits (software development kit, SDK) for advertising are embedded in various APKs (Android® operating system application package, Android application package), and an advertising component in these APKs is popped up to induce a user to download an application for installation, and consequently the user may still be induced to install some malicious software and the user may still be induced to install some malicious software.

SUMMARY

An application download method and a device provided according to some embodiments of this application are intended to reduce a risk that a user is induced to download and install a malicious application.

According to a first aspect, this application provides an application download monitoring method, including the following steps: first, detecting, by a mobile terminal, whether access URL information requested by a plurality of first applications includes an application download request; when detecting that access URL information requested by any one of the plurality of first applications includes an application download request, blocking, by the mobile terminal, the application download request, and sending the URL information to a server; then, querying, by the server based on the application download request in the URL information, whether a security analysis result of a second application corresponding to the application download request exists, and if finding the security analysis result, sending, by the server, the security analysis result to the mobile terminal; and then determining, by the mobile terminal based on the security analysis result, whether to download the second application.

The mobile terminal monitors, at an underlying layer, behavior of requesting to download a new application in all applications or some specified applications, and reports the behavior to the server to query a security analysis result of the new application, and then the mobile terminal performs corresponding protection processing on download behavior based on the security analysis result delivered by the server. In this way, the behavior of downloading the new application in all the applications or the some specified applications is effectively monitored and protected at the underlying layer.

In some possible implementations, the method further includes the following steps: sending, by the mobile terminal, a list of application package names of installed applications to the server; and configuring, by the server, monitoring information based on the list of application package names, and sending the monitoring information to the mobile terminal, where the monitoring information includes a list of application package names of the plurality of first applications that need to be monitored and a rule of identifying an application download request in URL information; and correspondingly, the step of detecting, by a mobile terminal, whether access URL information requested by any one of a plurality of first applications includes an application download request includes: detecting, by the mobile terminal based on the monitoring information, whether the access URL information requested by any one of the plurality of first applications that need to be monitored includes an application download request. There is no limitation on an order between steps of reporting the list of application package names of installed applications by the mobile terminal and configuring and delivering the monitoring information by the server and the steps of the method described in the first aspect.

The server periodically configures and delivers monitoring information, so that a monitoring range can be updated in a timely manner and a protection effect can be improved. In addition, the mobile terminal can distinguish between an application that needs to be monitored and an application that does not need to be monitored that are on the mobile terminal, and for the application that does not need to be monitored, the mobile terminal may not report URL information. Therefore, while security is ensured, a monitoring process is simplified, and resources occupied in the monitoring process are reduced.

According to a second aspect, this application provides an application download monitoring method implemented on a mobile terminal side, where the method includes: first, detecting, by a mobile terminal, whether access URL information requested by a plurality of first applications includes an application download request; when detecting that access URL information requested by any one of the plurality of first applications includes an application download request, blocking, by the mobile terminal, the application download request, and sending the URL information to a server; then, receiving, by the mobile terminal, a security analysis result sent by the server, where the security analysis result is a security analysis result that is corresponding to a second application and that is found by the server based on the application download request in the URL information; and then determining, by the mobile terminal based on the security analysis result, whether to download the second application.

In some possible implementations, the method further includes: sending, by the mobile terminal, a list of application package names of installed applications to the server; and then receiving, by the mobile terminal, monitoring information sent by the server, where the monitoring information includes a list of application package names of the plurality of first applications that need to be monitored and a rule of identifying an application download request in URL information; and correspondingly, the step of detecting, by a mobile terminal, whether access URL information requested by any one of a plurality of first applications includes an application download request includes: detecting, by the mobile terminal based on the monitoring information, whether the access URL information requested by any one of the plurality of first applications that need to be monitored includes an application download request. There is no limitation on an order between steps of reporting the list of application package names of installed applications by the mobile terminal and configuring and delivering the monitoring information by the server and the steps of the method described in the second aspect.

In some possible implementations, the step of detecting, by the mobile terminal based on the monitoring information, whether the access URL information requested by any one of the plurality of first applications that need to be monitored includes an application download request specifically includes: detecting, by the mobile terminal based on the list of application package names of the plurality of first applications that need to be monitored, whether the plurality of first applications request access URL information; and when detecting the access URL information requested by any one of the plurality of first applications, detecting, by the mobile terminal according to the rule of identifying an application download request in URL information, whether the access URL information requested by the first application includes an application download request.

In some possible implementations, the step of determining, by the mobile terminal based on the security analysis result, whether to download the second application specifically includes: determining, by the mobile terminal based on the security analysis result, to directly prohibit downloading the second application, determining, based on selection input of a user, whether to download the second application, or determining to directly allow downloading the second application.

In some possible implementations, when the mobile terminal determines, based on the selection input of the user, whether to download the second application, the method further includes: displaying, by the mobile terminal, a prompt screen for selection, and obtaining a selection operation of the user; and determining, based on the selection operation, to prohibit or allow downloading the second application.

In some possible implementations, when the mobile terminal determines to prohibit downloading the second application, the method further includes at least either of the following steps: displaying, by the mobile terminal, a prompt screen that indicates downloading the second application has been prohibited; and indicating, by the mobile terminal, download information of a third application related to the second application, obtaining a download operation that is selected by the user based on the download information of the third application, and downloading the third application.

According to a third aspect, this application provides an application download monitoring method implemented on a server side, where the method includes: receiving, by a server, access URL information that is sent by a mobile terminal and that is requested by any one of a plurality of first applications, where the URL information includes an application download request; and then querying, by the server based on the application download request in the URL information, whether a security analysis result of a second application corresponding to the application download request exists, and if finding the security analysis result, sending, by the server, the security analysis result to the mobile terminal.

In some possible implementations, the method further includes: receiving, by the server, a list of application package names of installed applications from the mobile terminal; and then configuring, by the server, monitoring information based on the list of application package names, and sending the monitoring information to the mobile terminal, where the monitoring information includes a list of application package names of the plurality of first applications that need to be monitored and a rule of identifying an application download request in URL information.

In some possible implementations, the method further includes: if the server does not find the security analysis result of the second application corresponding to the application download request, requesting, by the server, to download the second application based on the URL information, performing security analysis on the second application after downloading, and recording a security analysis result.

When receiving a request that is for downloading a new application and that is reported by the mobile terminal for the first time on an entire network, the server downloads, into the server, the new application from an application server based on URL information corresponding to the download request, to perform security analysis, and records a security analysis result, so as to implement that the server updates security monitoring of a network application in a timely manner, to further improve an effect of protecting application installation by the mobile terminal.

In some possible implementations, the method further includes: if the server does not find the security analysis result of the second application corresponding to the application download request, notifying, by the server, the mobile terminal that downloading the second application is allowed.

According to a fourth aspect, this application provides a mobile terminal for implementing application download monitoring, where the mobile terminal includes a core firewall component and a control guide unit, the core firewall component is configured to detect whether access URL information requested by a plurality of first applications includes an application download request, and when detecting that access URL information requested by any one of the plurality of first applications includes an application download request, block the application download request; the control guide unit is configured to: send the URL information to a server, receive a security analysis result sent by the server, and send the security analysis result to the core firewall component, where the security analysis result is a security analysis result that is corresponding to a second application and that is found by the server based on the application download request in the URL information; and correspondingly, the core firewall component is further configured to determine, based on the security analysis result, whether to download the second application.

In some possible embodiments, the control guide unit is further configured to send a list of application package names of installed applications to the server; correspondingly, the mobile terminal further includes: a policy delivery unit, configured to: receive monitoring information sent by the server, and send the monitoring information to the core firewall component, where the monitoring information includes a list of application package names of the first applications that need to be monitored and a rule of identifying an application download request in URL information; and correspondingly, the core firewall component is configured to detect, based on the monitoring information, whether the access URL information requested by any one of the first applications includes an application download request.

In some possible embodiments, the mobile terminal further includes a control interaction interface, where the core firewall component uploads, to the control guide unit by using the control interaction interface, detected URL information that includes an application download request of at least one application of the plurality of first applications.

In some possible embodiments, the core firewall component is configured to: receive network traffic of the mobile terminal, and detect whether the access URL information requested by using application process IDs of the plurality of first applications includes an application download request.

According to a fifth aspect, this application provides a server for implementing application download monitoring, where the server includes: a data storage unit, configured to store a security analysis result of a second application; and a URL analysis unit, configured to: receive access URL information that is sent by a mobile terminal and that is requested by any one of a plurality of first applications, query, according to an application download request in the URL information, whether the security analysis result of the second application corresponding to the application download request exists, and if the security analysis result is found, send the security analysis result to the mobile terminal, where the URL information includes the application download request.

In some possible embodiments, the URL analysis unit is further configured to receive a list of application package names of installed applications from the mobile terminal; and correspondingly, the server further includes: a policy service unit, configured to: configure monitoring information based on the list of application package names, and send the monitoring information to the mobile terminal, where the monitoring information includes a list of application package names of the plurality of first applications that need to be monitored and a rule of identifying an application download request in URL information.

According to a sixth aspect, this application provides a mobile terminal for implementing application download monitoring, where the mobile terminal includes: at least one processor; and at least one memory, where the at least one memory includes several instructions, where the at least one processor executes the several instructions to enable the mobile terminal to perform at least the following steps: detecting whether access URL information requested by a plurality of first applications includes an application download request; when detecting that access URL information requested by any one of the plurality of first applications includes an application download request, blocking the application download request, and sending the URL information to a server; then receiving a security analysis result sent by the server, where the security analysis result is a security analysis result that is corresponding to a second application and that is found by the server based on the application download request in the URL information; and then determining, based on the security analysis result, whether to download the second application.

In some possible implementations, the at least one processor executes the several instructions to enable the terminal to further perform the following steps; sending a list of application package names of installed applications to the server; and receiving monitoring information sent by the server, where the monitoring information includes a list of application package names of the plurality of first applications that need to be monitored and a rule of identifying an application download request in URL information; and correspondingly, in the step of detecting whether access URL information requested by any one of a plurality of first applications includes an application download request, the at least one processor executes the several instructions to enable the terminal to perform at least the following step; detecting, based on the monitoring information, whether the access URL information requested by any one of the plurality of first applications that need to be monitored includes an application download request.

In some possible implementations, in the step of detecting, by the mobile terminal based on the monitoring information, whether the access URL information requested by any one of the plurality of first applications that need to be monitored includes an application download request, the at least one processor executes the several instructions to enable the terminal to perform at least the following steps: detecting, based on the list of application package names of the plurality of first applications that need to be monitored, whether the plurality of first applications request access URL information; and when detecting the access URL information requested by any one of the plurality of first applications, detecting, according to the rule of identifying an application download request in URL information, whether the access URL information requested by the first application includes an application download request.

In some possible implementations, in the step of determining, based on the security analysis result, whether to download the second application, the at least one processor executes the several instructions to enable the terminal to perform at least the following step: determining, based on the security analysis result, to directly prohibit downloading the second application, determining, based on selection input of a user, whether to download the second application, or determining to directly allow downloading the second application.

In some possible implementations, the mobile terminal further includes a touchscreen; and in the step of determining, based on selection input of a user, whether to download the second application, the at least one processor executes the several instructions to enable the terminal to perform at least the following steps: making the touchscreen display a prompt screen for selection, and obtaining a selection operation of the user; and determining, based on the selection operation, to prohibit or allow downloading the second application.

In some possible implementations, the mobile terminal further includes a touchscreen; and after the step of determining to prohibit downloading the second application, the at least one processor executes the several instructions to enable the terminal to perform at least one of the following steps: making the touchscreen display a prompt screen that indicates downloading the second application has been prohibited; and making the touchscreen indicate download information of a third application related to the second application, obtaining a download operation that is selected by the user based on the download information of the third application, and then downloading the third application.

According to a seventh aspect, this application provides a server for implementing application download monitoring, where the server includes at least one processor and at least one memory, where the at least one memory includes several instructions, the at least one processor executes the several instructions to enable the server to perform at least the following steps: receiving access URL information that is sent by a mobile terminal and that is requested by any one of a plurality of first applications, where the URL information includes an application download request; and querying, based on the application download request in the URL information, whether a security analysis result of a second application corresponding to the application download request exists, and if finding the security analysis result, sending the security analysis result to the mobile terminal.

In some possible implementations, the at least one processor executes the several instructions to enable the server to further perform the following steps: receiving a list of application package names of installed applications from the mobile terminal; and configuring monitoring information based on the list of application package names, and sending the monitoring information to the mobile terminal, where the monitoring information includes a list of application package names of the plurality of first applications that need to be monitored and a rule of identifying an application download request in URL inform In some possible implementations, the at least one processor executes the several instructions to enable the server to further perform the following steps: if the server does not find the security analysis result of the second application corresponding to the application download request, requesting to download the second application based on the URL information, performing security analysis on the second application after downloading, and recording a security analysis result.

In some possible implementations, the at least one processor executes the several instructions to enable the server to further perform the following step: if the server does not find the security analysis result of the second application corresponding to the application download request, notifying the mobile terminal that downloading the second application is allowed.

According to an eighth aspect, this application provides a graphical user interface (GUI) displayed on a touchscreen of a mobile terminal, where the graphical user interface includes: displaying a first GUI on the touchscreen; then, in response to a case in which it is detected that access URL information requested by any one of a plurality of first applications includes an application download request, sending the URL information to a server, where the requesting the access URL information is triggered by a user execution operation; in response to determining, based on a received security analysis result that is of a second application and that is sent by the server based on the URL information, to directly prohibit downloading the second application, determining, based on selection input of a user, whether to download the second application, or determining to directly allow downloading the second application, displaying a second GUI, where the second GUI includes a screen for indicating that downloading the second application has been prohibited, determining, based on the selection input of the user, whether to download the second application, or indicating that downloading the second application has been allowed; and in response to determining, based on the selection input of the user, whether to download the second application, and in response to a selection operation entered by the user, determining to prohibit or allow downloading the second application.

In some possible implementations, the graphical user interface further includes: in response to determining to prohibit downloading the second application, the second GUI further includes: a screen that indicates download information of a third application related to the second application; and in response to obtaining a download operation that is selected by the user based on the download information of the third application, the third application is downloaded, and a third GUI is displayed, where the third GUI includes a screen indicating that the third application has been downloaded.

The graphical user interface provided in the embodiments of this application can display, to the user, the monitoring and protection process performed when the URL information requested by any one of the plurality of first applications includes an application download request, and provides the user with selectable interaction based on the security analysis result. This improves user experience.

According to a ninth aspect, this application provides a computer program product, where when the computer program product runs on a mobile terminal, the mobile terminal is enabled to perform the method described in any one of the second aspect and the possible implementations of the second aspect.

According to a tenth aspect, this application provides a computer program product, where when the computer program product runs on a server, the server is enabled to perform the method described in any one of the third aspect and the possible implementations of the third aspect.

According to an eleventh aspect, this application provides a computer-readable storage medium, including an instruction, where when the instruction runs on a server, the server is enabled to perform the method described in any one of the second aspect and the possible implementations of the second aspect.

According to a twelfth aspect, this application provides a computer-readable storage medium, where when the instruction runs on a server, the server is enabled to perform the method described in any one of the third aspect and the possible implementations of the third aspect.

According to a thirteenth aspect, this application provides a system for implementing application download monitoring, where the system includes at least one mobile terminal and server, the mobile terminal is configured to: detect whether access URL information requested by a plurality of first applications includes an application download request, and when detecting that access URL information requested by any one of the plurality of first applications includes an application download request, block the application download request, and send the URL information to the server; the server is configured to: query; based on the application download request in the URL information, whether a security analysis result of a second application corresponding to the application download request exists, and if finding the security analysis result, send the security analysis result to the mobile terminal; and the mobile terminal is further configured to determine, based on the security analysis result, whether to download the second application.

In some possible implementations, the mobile terminal is further configured to: send a list of application package names of installed applications to the server, receive monitoring information sent by the server, then detect, based on the monitoring information, whether the access URL information requested by any one of the plurality of first applications that need to be monitored includes an application download request; and the server is further configured to: receive the list of application package names of installed applications on the mobile terminal, configure the monitoring information based on the list of application package names, and send the monitoring information to the mobile terminal, where the monitoring information includes a list of application package names of the plurality of first applications that need to be monitored and a rule of identifying an application download request in URL information.

In some possible implementations, the server is further configured to: if the server does not find the security analysis result of the second application corresponding to the application download request, request to download the second application based on the URL information, perform security analysis on the second application after downloading, and record a security analysis result.

In some possible implementations, if the server does not find the security analysis result of the second application corresponding to the application download request, the server notifies the mobile terminal that downloading the second application is allowed.

DESCRIPTION OF EMBODIMENTS

Terms used in the embodiments of this application are only for the purpose of illustrating specific embodiments, and are not intended to limit this application. The terms "one", "a" and "the" of singular forms used in this specification and the appended claims of this application are also intended to include plural forms, unless otherwise specified in the context clearly. It should further be understood that the term "and/or" likely to be used in this application indicates and includes any or all possible combinations of one or more associated listed items.

The following embodiments are described below: embodiments of a mobile terminal, a server, a graphical user interface (which may be referred to as a GUI for short below) for such a mobile terminal, and a method in which a mobile terminal and a server cooperate with each other to implement application download monitoring.

The embodiments of this application are to perform, through cooperation of a mobile terminal and a server, monitoring and protection on behavior of requesting to download a new application from all applications or some designated applications of the mobile terminal. Technical solutions in the embodiments are further described below with reference to accompanying drawings of some embodiments.

Figure 1:
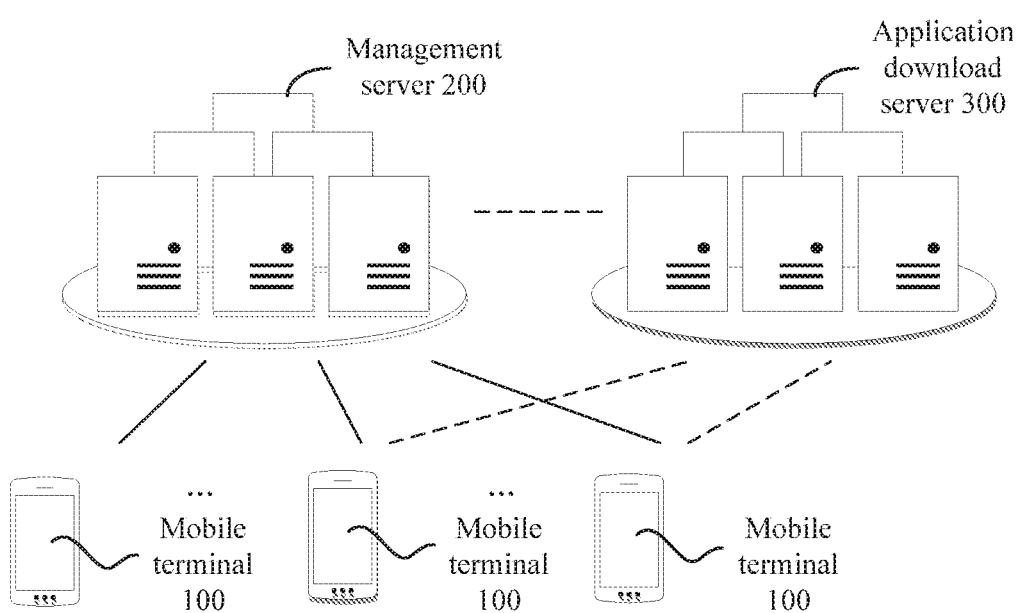
FIG. 1 is a schematic architectural diagram of a possible system including a mobile terminal and a server according to some embodiments of this application.

FIG. 1 is a schematic diagram of a brief architecture of a system including a mobile terminal and a server according to some embodiments of this application. As shown in FIG. 1, the system includes several mobile terminals and servers, and at least one application download server. The plurality of mobile terminals and servers communicate with each other to implement security management of the mobile terminals by the servers, and the security management may include security management of a new-application download, providing a secure application download, and the like. In addition, the mobile terminal requests, based on URL information, to download an application from an application download server during a running process. In the embodiments of this application, when a mobile terminal on an entire network reports URL information for the first time, the server may also request, based on the URL information, an application download from the application download server, so as to perform security analysis, record, and update.

In some embodiments of this application, the mobile terminal may be a portable electronic device that further includes other functions such as a personal digital assistant and/or a music player function, for example, a mobile phone, a tablet computer, and a wearable electronic device (such as a smartwatch) having a radio communication function. An example of an embodiment of the portable electronic device includes but is not limited to a portable electronic device installed with iOS®, Android®, Microsoft®, or other operating systems. The portable electronic device may also be another portable electronic device, such as a laptop (Laptop) having a touch-sensitive surface (such as a touchpad). It should further be understood that in some other embodiments of this application, the mobile terminal may alternatively be a device that can be used as a mobile security agent, for example, a remote control or a smart environment detector that conforms to same specifications.

Figure 2:
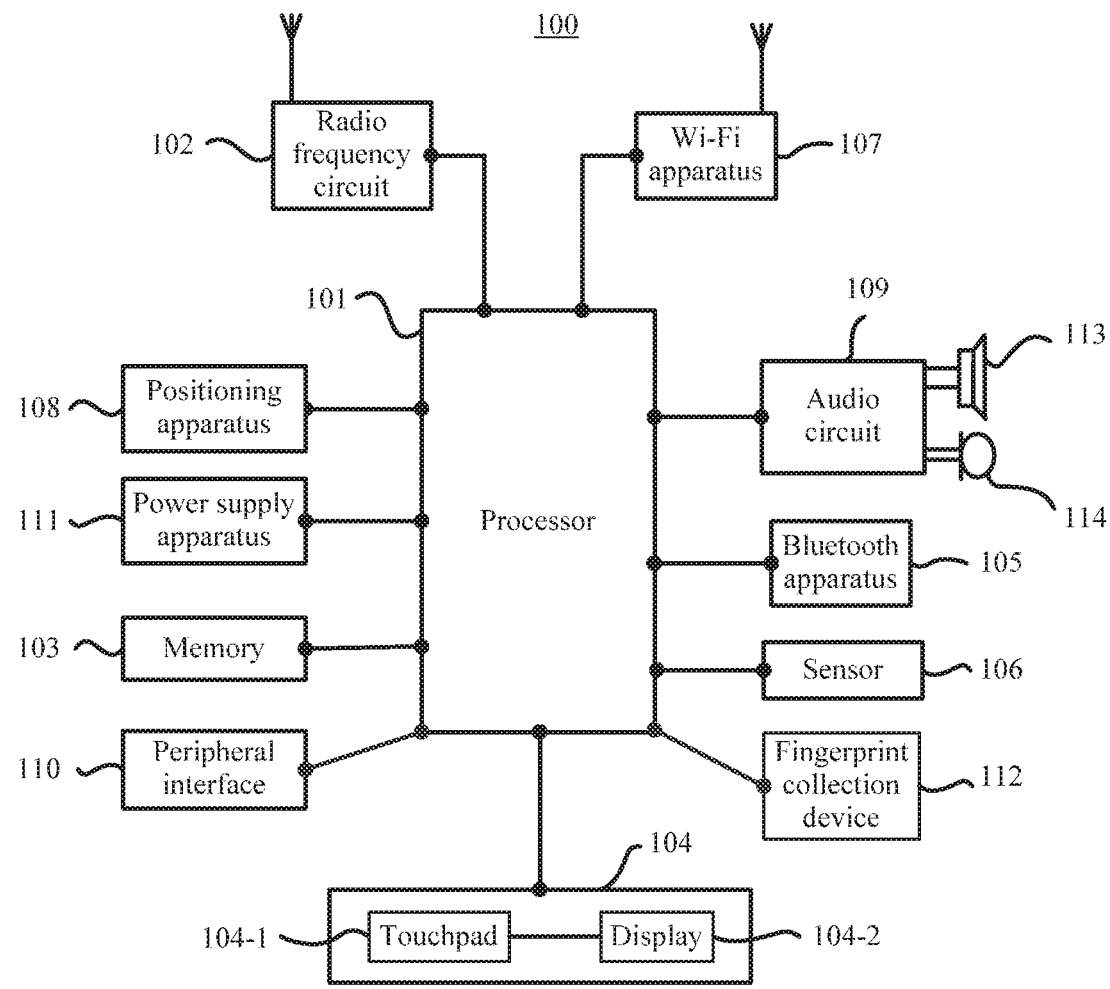
FIG. 2 is a schematic structural diagram of a mobile terminal according to an embodiment of this application.

As shown in FIG. 2, the mobile terminal in the embodiments of this application may be a mobile phone 100. An embodiment is specifically described below by using the mobile phone 100 as an example. It should be understood that the illustrated mobile phone 100 is only an example of the mobile terminal, and the mobile phone 100 may have more or fewer parts than those shown in the figure, a combination of two or more parts, or parts disposed differently. The various parts shown in the figure may be implemented by using hardware, software, or a combination of hardware and software, including one or more signal processors and/or application-specific integrated circuits.

As shown in FIG. 2, the mobile phone 100 may specifically include the following hardware: a processor 101, a radio frequency (RF) circuit 102, a memory 103, a touchscreen 104, a Bluetooth apparatus 105, one or more sensors 106, and a Wi-Fi apparatus 107, a positioning apparatus 108, an audio circuit 109, a peripheral interface 110, a power supply system 111, and another part. These parts may communicate with each other by using one or more communications buses or signal lines (not shown in FIG. 2). A person skilled in the art can understand that the hardware structure shown in FIG. 2 does not constitute a limitation on the mobile phone 100, and the mobile phone 100 may include more or fewer parts than those shown in the figure, or a combination of some parts, or parts disposed differently.

The parts of the mobile phone 100 are described in detail below with reference to FIG. 2.

The processor 101 is a control center of the mobile phone 100, is connected to all parts of the mobile phone 100 by using various interfaces and lines, and performs various functions of the mobile phone 100 and data processing by running or executing an application program (which may be referred to as App for short below) stored in the memory 103 and invoking data and an instruction that are stored in the memory 103. In some embodiments, the processor 101 may include one or more processing units, or an application processor and a modem processor may be integrated into the processor 101. The application processor mainly processes an operating system, a user interface, an application program, and the like. The modem processor mainly processes radio communication. It may be understood that the modem processor may alternatively not be integrated into the processor 101. The processor 101 may be an integrated chip. In some embodiments of this application, the processor 101 may further include a fingerprint verification chip, configured to verify a collected fingerprint.

The radio frequency circuit 102 may be configured to receive and send a radio signal in an information receiving and sending process or a call process. Specifically, the radio frequency circuit 102 may receive downlink data from a base station, and then send the downlink data to the processor 101 for processing; and send related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may also communicate with another device through radio communication. Any communications standard or protocol may be used for the radio communication, including but not limited to Global System for Mobile Communications, General Packet Radio Service, Code Division Multiple Access, Wideband Code Division Multiple Access, Long Term Evolution, an email, and a short message service, or the like.

The memory 103 is configured to store an application program and data. The processor 101 performs various functions of the mobile phone 100 and data processing by running the application program and data stored in the memory 103. The memory 103 mainly includes a program storage area and a data storage area. The program storage area may store an operating system, an application program required by at least one function (such as a voice play function and an image play function). The data storage area may store data (such as audio data and a phone book) that is created based on use of the mobile phone 100. In addition, the memory 103 may include a high-speed random access memory, and may further include a non-volatile memory such as a disk storage device or a flash memory device, another volatile solid-state storage device, or the like. The memory 103 may store various operating systems such as an iOS® operating system developed by Apple Inc., and an Android® operating system developed by Google Inc.

The touchscreen 104 may include a touchpad 104-1 and a display 104-2. The touchpad 104-1 may collect a touch event performed by a user of the mobile phone 100 on or near the touchpad 104-1 (for example, an operation performed by the user by using a suitable object such as a finger and a stylus on or near the touchpad 104-1), and send collected touch information to another device such as the processor 101. The touch event performed by the user near the touchpad 104-1 may be referred to as a floating touch. The floating touch may mean that the user does not need to directly touch a touchpad to select, move, or drag a target (for example, an icon), and the user only needs to be near the mobile terminal to perform a desired function. In an application scenario of a floating touch, terms "touch", "contact", and the like do not imply a direct contact with a touchscreen, but a proximate or nearby contact. The touchpad 104-1 that can be used for a floating touch may be implemented by using a capacitive type, an infrared light sensor, an ultrasonic wave type, or the like. The touchpad 104-1 may include two parts: a touch detection apparatus and a touch controller. The touch detection apparatus detects a touch orientation of the user, detects a signal brought by a touch operation, and transmits the signal to the touch controller. The touch controller receives touch information from the touch detection apparatus, converts the touch information into contact coordinates, and sends the contact coordinates to the processor 101. The touch controller may further receive a command sent by the processor 101 and execute command. In addition, the touchpad 104-1 may be implemented in a plurality of types, such as a resistive type, a capacitive type, an infrared type, and a surface acoustic wave type. The display unit (also referred to as a display screen) 104-2 may be configured to display information input by the user or information provided for the user, and various menus of the mobile phone 100. The display 104-2 may be configured in a form of a liquid crystal display; an organic light-emitting diode, or the like. The touchpad 104-1 may cover the display 104-2. After detecting a touch event on or near the touchpad 104-1, the touchpad 104-1 transmit information about the operation to the processor 101 to determine a touch event type. Then, the processor 101 may provide corresponding visual output on the display 104-2 based on the touch event type. In FIG. 2, the touchpad 104-1 and the display screen 104-2 act as two independent parts to implement input and output functions of the mobile phone 100. However, in some embodiments, the touchpad 104-1 and the display screen 104-2 may be integrated to implement the input and output functions of the mobile phone 100. It may be understood that the touchscreen 104 is formed by stacking a plurality of layers of materials. In the embodiments of this application, only the touchpad (layer) and the display screen (layer) are shown, and other layers are not described in the embodiments of this application. In addition, in some other embodiments of this application, the touchpad 104-1 may cover the display 104-2, and a size of the touchpad 104-1 is larger than a size of the display screen 104-2, so that the display screen 104-2 is completely covered by the touchpad 104-1. Alternatively, the touchpad 104-1 may be disposed on a front face of the mobile phone 100 in a whole-panel form, that is, touches of the user on the front face of the mobile phone 100 can all be perceived by the mobile phone. In this way, all-touch experience can be obtained on the front face of the mobile phone. In some other embodiments, the touchpad 104-1 is disposed on a front face of the mobile phone 100 in a whole-panel form, and the display screen 104-2 may also be disposed on the front face of the mobile phone 100 in a whole-panel form, so that a non-bezel (Bezel) structure can be obtained on the front face of the mobile phone.

In the embodiments of this application, the mobile phone 100 may further have a fingerprint recognition function. For example, a fingerprint reader may be configured on a back face (for example, below a rear camera) of the mobile phone 100 or on a front face (for example, below the touchscreen 104) of the mobile phone 100. Details are not described herein.

The mobile phone 100 may further include a Bluetooth apparatus 105, configured to implement data exchange between the mobile phone 100 and another mobile terminal (for example, a mobile phone and a smartwatch) at a short distance. The Bluetooth apparatus in the embodiments of this application may be an integrated circuit, a Bluetooth chip, or the like.

The mobile phone 100 may further include at least one sensor 106, such as a light sensor, a motion sensor, and another sensor. Specifically, the light sensor may include an ambient light sensor and a proximity sensor. The ambient light sensor may adjust luminance of the display of the display screen 104 based on brightness of ambient light. The proximity sensor may turn off the display when the mobile phone 100 moves close to an ear. As a type of motion sensor, an accelerometer sensor may detect a magnitude of acceleration in directions (generally, three axes), may detect a magnitude and direction of gravity when the mobile phone is static, and may be configured to recognize a mobile phone posture application (such as landscape-portrait mode switch, related games, or magnetometer posture calibration), a vibration-recognition-related function (such as a pedometer or a knock), or the like. For other sensors that can be configured in the mobile phone 100, for example, a gyroscope, a barometer, a hygrometer, a thermometer, or an infrared sensor, details are not described herein.

The Wi-Fi apparatus 107 is configured to provide the mobile phone 100 with network access conforming to a Wi-Fi related standard protocol. The mobile phone 100 may access a Wi-Fi access point by using the Wi-Fi apparatus 107, so as to help the user receive and send an email, browse a web page, access streaming media, and the like. The Wi-Fi apparatus 107 provides wireless broadband Internet access for the user. In some other embodiments, the Wi-Fi apparatus 107 may also function as a Wi-Fi wireless access point, and may provide Wi-Fi network access for another mobile terminal.

The positioning apparatus 108 is configured to provide a geographical location for the mobile phone 100. It may be understood that the positioning apparatus 108 may be specifically a receiver of a positioning system such as the global positioning system (GPS), the Beidou satellite navigation system, or the GLONASS of Russia. After receiving a geographical location sent by the positioning system, the positioning apparatus 108 sends the information to the processor 101 for processing, or sends the information to the memory 103 for storage. In some other embodiments, the positioning apparatus 108 may be a receiver of an assisted global positioning system (AGPS). The AGPS is an operation mode in which GPS positioning is performed under specific assist, and may increase a positioning speed of the mobile phone 100 by using a signal from a base station and a GPS satellite signal. In the AGPS system, the positioning apparatus 108 may obtain positioning assist by communicating with an auxiliary positioning server (for example, a mobile phone positioning server). In the AGPS system, the auxiliary server assists the positioning apparatus 108 in performing distance measurement and positioning services. In this case, the auxiliary positioning server provides positioning assistance by communicating, by using a radio communications network, with a mobile terminal such as the positioning apparatus 108 (namely, the GPS receiver) of the mobile phone 100. In some other embodiments, the positioning apparatus 108 may alternatively use a positioning technology that is based on a Wi-Fi access point. Each Wi-Fi access point has a globally unique MAC address, and the mobile terminal may scan and collect a broadcast signal of a surrounding Wi-Fi access point when a Wi-Fi service is enabled, so that a MAC address broadcast by the Wi-Fi access point can be obtained. The mobile terminal transmits, to a location server by using a radio communications network, data (such as the MAC address) that can identify the Wi-Fi access point. The location server retrieves a geographical location of each Wi-Fi access point, and calculates a geographical location of the mobile terminal with reference to strength of the Wi-Fi broadcast signal, and sends the geographical location of the mobile terminal to the positioning apparatus 108 of the mobile terminal.

The audio circuit 109, the loudspeaker 113, and the microphone 114 may provide an audio interface between the user and the mobile phone 100. The audio circuit 109 may transmit, to the loudspeaker 113, an electrical signal that is obtained by converting received audio data. The loudspeaker 113 converts the electrical signal into a sound signal and outputs the sound signal. In addition, the microphone 114 converts a collected sound signal into an electrical signal, and the audio circuit 109 receives and converts the electrical signal into audio data, and outputs the audio data to the RF circuit 102, to send the audio data to, for example, another mobile phone, or outputs the audio data to the memory 103 for further processing.

The peripheral interface 110 is configured to provide various interfaces for external input/output devices (for example, a keyboard, a mouse, an external display, an external memory, and a subscriber identity module card). For example, the peripheral interface 110 is connected to a mouse by using a universal serial bus (USB) interface, and is connected, by using a metal contact on a card slot of a subscriber identity module card to the subscriber identity module (SIM) card provided by a telecommunication operator. The peripheral interface 110 may be configured to couple the foregoing external input/output peripheral devices to the processor 101 and the memory 103.

The mobile phone 100 may further include the power supply apparatus 111 (for example, a battery and a power supply management chip) that supplies power to all the parts. The battery may be logically connected to the processor 101 by using the power supply management chip, so as to implement functions such as charging and discharging management and power consumption management by using the power supply apparatus 111.

Although not shown in FIG. 2, the mobile phone 100 may further include a camera (a front camera and/or a rear camera), a flash, a micro projection apparatus, a near field communication (NFC) apparatus, and the like. Details are not described herein.

The following embodiments may all be implemented on the mobile phone 100 having the foregoing structure.

In the embodiments of this application, a server 200 may be a computer device including a processor 204, a memory 203, a system bus 205, and a communications interface 202. The memory 203 may include a RAM and a ROM, or any fixed storage medium, or a removable storage medium, and is configured to store a program that can be used to execute the embodiments of this application or an application database in the embodiments of this application. The memory 203 receives input of another component by using the bus 205 or information stored in the memory 203 is invoked by another component by using the bus 205. The processor 204 is configured to: execute the program used for the embodiments of this application that is stored in the memory 203, and perform bidirectional communication with another apparatus by using the bus. The memory 203 and the processor 204 may also be integrated into a physical module applied to the embodiments of this application. The program used to implement the embodiments of this application is stored and runs on the physical module. All components of the server 200 are coupled together by using the bus system 205. In addition to a data bus, the bus system 205 may further include a power supply bus, a control bus, a state signal bus, and the like. However, for clear description, various buses are denoted by the bus system 205 in the figure.

In some embodiments, the electronic device 200 may further include a display and an input apparatus, may be an appropriate apparatus such as a cathode ray tube (CRT, Cathode Ray Tube) display, a liquid crystal display (LCD, Liquid Crystal Display), and a touchscreen (Touch Screen), and receives an instruction by using the bus 205 so that a graphical user interface is displayed on a screen of the display. The input apparatus may include any appropriate apparatus such as a keyboard, a mouse, a track recognizer, or a voice recognition interface, and is configured to: receive user input, generate control input, and send the control input to the processor or another component by using the bus 205. Displays of some electronic devices 200 are provided with a touchscreen, and the display is also an input apparatus.

In some other embodiments, the server 200 may also be a deployed cloud, that is, is composed of a plurality of service devices. Each service device may have its own processor, memory, system bus, and communications interface, and the management service devices may communicate with each other by using a network.

Figure 3:
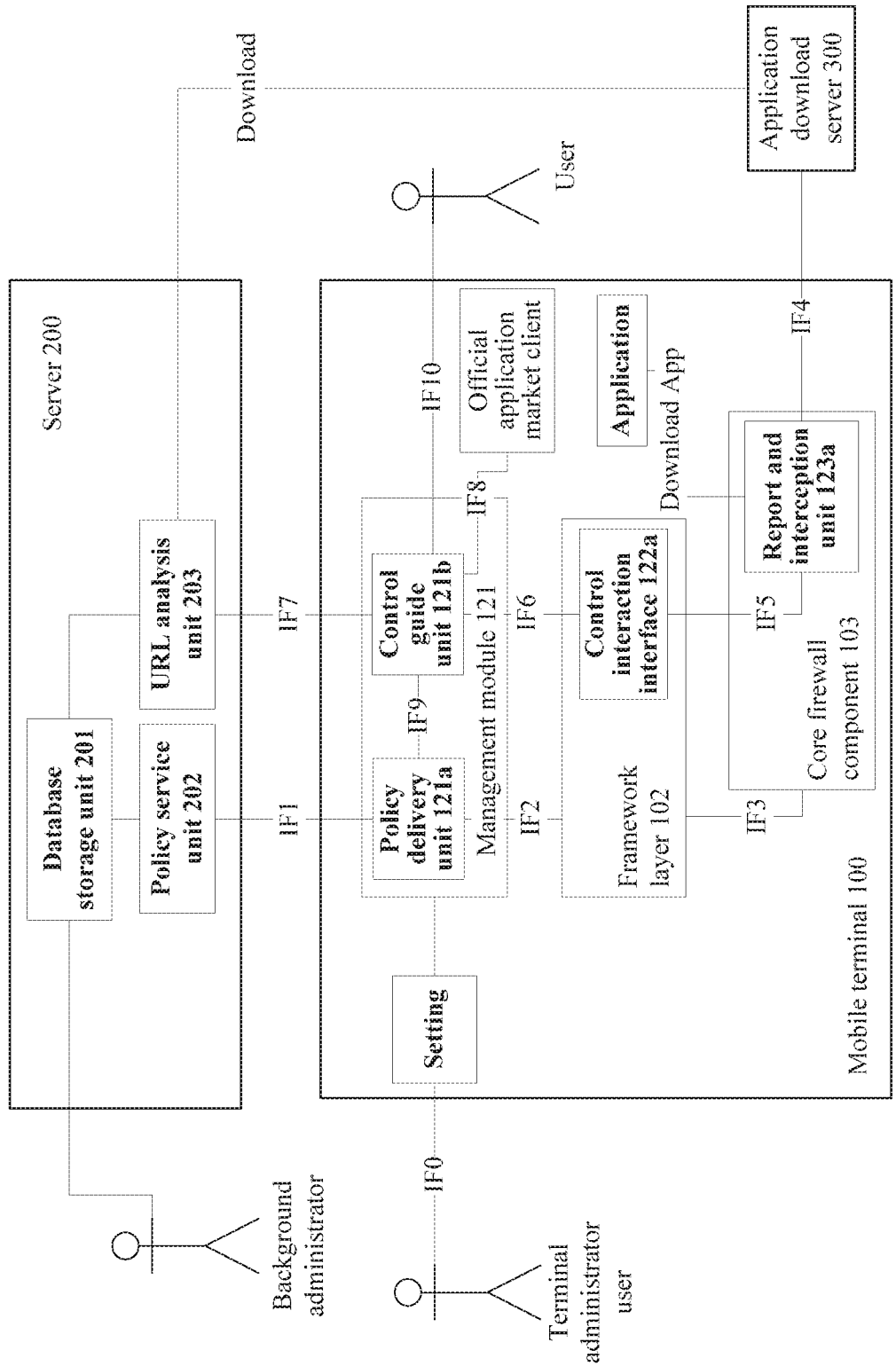
FIG. 3 is a schematic architectural diagram of a possible system according to an embodiment of this application.

FIG. 3 is a schematic architectural diagram of a possible system according to an embodiment of this application. As shown in FIG. 3, the system includes a mobile terminal 100, a server 200, and an application download server 300 (App_DL_Server).

The mobile terminal 100 may include a management module 121 (phone manager), a framework layer 122 (framework, FW), and a core firewall component 123 (netfilter). The management module 121 may include a policy delivery unit 121*a* and a control guide unit 121*b*, the framework layer 122 may include a control interaction interface 122*a*, and the core firewall component 123 may include a report and interception unit 123*a*. The server 200 may be a server provided by a management server. The server 200 includes a database storage unit 201 (data base, DB, namely, database), a policy service unit 202 (policy server), and a URL analysis unit 203 (URL-Analyse). The units, a user, and the mobile terminal may communicate with each other by using interfaces IF0 to IF10 shown in FIG. 3.

Specifically, the policy server 202 is responsible for policy configuration and delivery, and configured policy information includes a name of a to-be-monitored APK package and a to-be-accessed URL (Universal Resource Locator, uniform resource locator). The URL is a regular expression, for example, *.apk matches all URL information that has an extension name of apk.

The URL-Analyse 203 is a URL analyzer that provides an interface for URL matching, to be specific, querying the database 201 for matching URL information reported by the mobile terminal. If matching succeeds, matching result information is returned. For a new URL, the URL is directly requested, to download an application. After the application is successfully downloaded, a security attribute of the application is checked by using a security check system and a result is recorded in the database 201.

The policy delivery unit 121*a* is responsible for receiving a policy delivery request from the server 200 and invoking an interface of the framework to configure an application download monitoring policy.

The control guide unit 121*a* reports URL information that is for application download and that is matched at an underlying layer, invokes the interface of the URL-Analyse 203 to perform URL matching, and determines, based on a returned result, whether to pop up a prompt box for the user, to indicate a risk and guide the user to a more secure means for download.

The control interaction interface 122*a* is a functional unit of the framework (framework layer) 122, and mainly functions as a bridging interface, that is, transmits policy configuration information and detection decision information from an application layer to the core firewall component 123, and reports matched URL information detected by the firewall component 123 at the underlying layer to the application layer, for example, provides a notification for an official application market client.

The report and interception unit 123*a* is located in the core firewall component 123, and is configured to: receive network traffic of the system, perform interception and matching, report successfully matched URL information to the application layer, block a URL request, and determine, based on a decision result of the application layer, to permit or reject the request.

In addition, the mobile terminal 100 may further include an official application market client, configured to provide an interface for downloading an official application. When the user chooses to download an application in the official application market, the interface is invoked to install the official application in the application market.

In addition, the application download server 300 may be an application download server provided by a third-party application download server.

A terminal administrator user may interact with the management module 121 by using the interface IF0, to set whether the management module 121 starts download monitoring and protection of an application from an unknown source. When download monitoring and protection are started, the management module 121 may provide a notification for the user by using the interface IF10 in a process of application download monitoring and protection. In some embodiments, the management module 121 may display a prompt by using a display device of the mobile terminal 100, for example, a touch display screen, and obtaining an input operation of the user, so as to implement a notification and interaction process. The policy service unit 202 may deliver a monitoring policy by using the interface IF1. The policy delivery unit 121*a* may deliver the monitoring policy to the underlying layer by using the interface IF2 and the interface IF3. The report and interception unit 203*a* may report URL information by using the interfaces IF5, IF6 and IF7. The URL analysis unit 203 delivers a security analysis result by using the interface IF7. The control guide unit 121*b* may deliver the security analysis result to the underlying layer by using the interfaces IF9, IF2, and IF3. In addition, the control guide unit 121*b* may communicate with the official application market client by using the interface IF8, for example, request the official application market client to download an alternative secure application.

Figure 4:
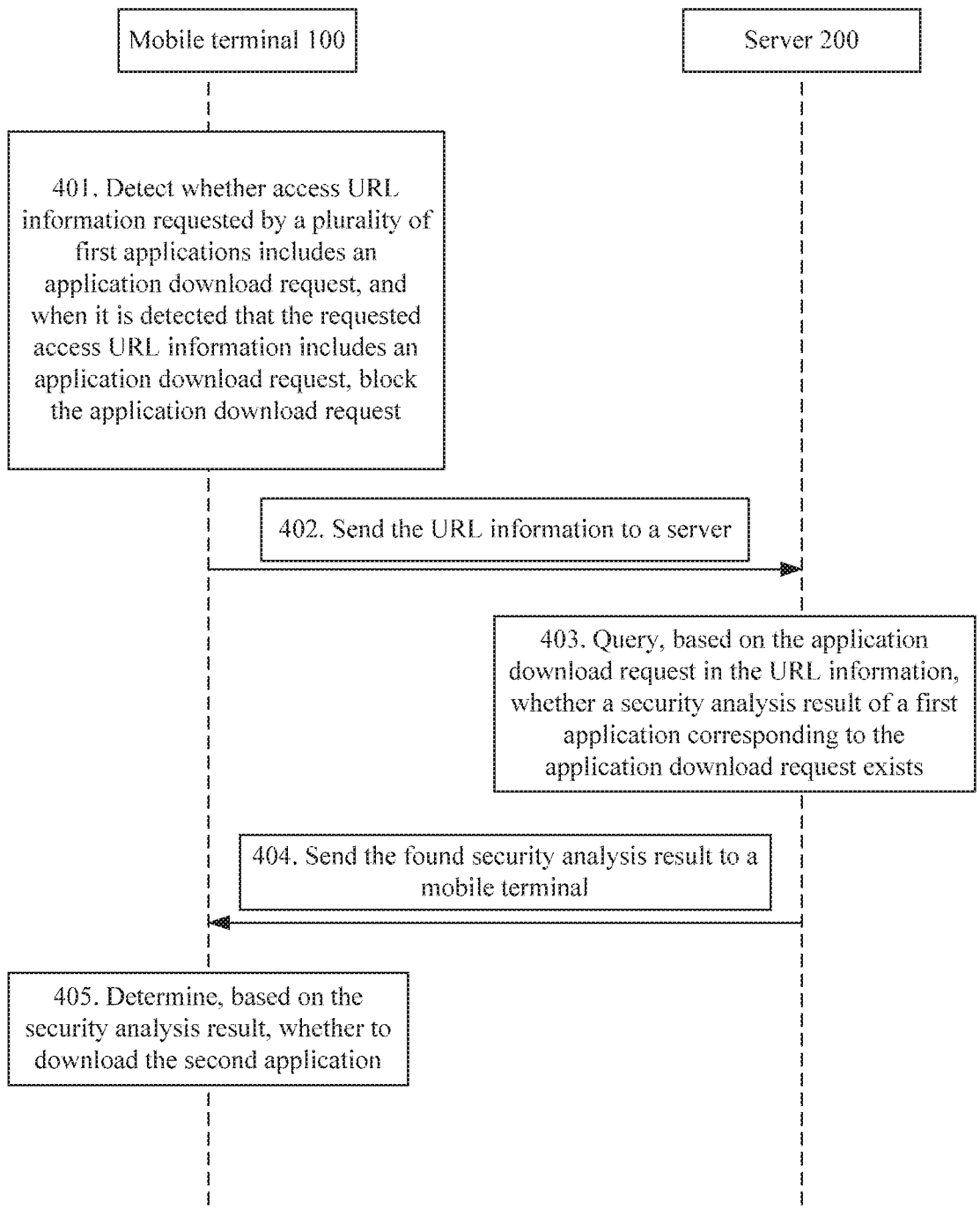
FIG. 4 is a schematic flowchart of an application download monitoring method according to an embodiment of this application.

The process in which the server 200 cooperates with the mobile terminal to implement application download monitoring and protection is further described below with reference to FIG. 3 and FIG. 4. In some embodiments, the method includes step 401 to step 405.

In step 401, the mobile terminal 100 detects whether access URL information requested by a plurality of first applications includes an application download request, and when detecting that access URL information requested by a first application includes an application download request, the mobile terminal 100 blocks the URL information. Then, in step 402, the URL information is sent to the server 200.

With reference to FIG. 3, in some embodiments, real-time detection is performed by the core firewall component 123 of the mobile terminal 100. When detecting that the access URL information requested by the first application includes an application download request, the core firewall component 123 of the mobile terminal 100 may temporarily block the corresponding application download request, and report the URL information to the server 200 by using an internal control interaction interface and the control guide unit 121*b* of the management module 121 of the mobile terminal 100.

Then, in step 403, the server 200 queries, based on the application download request in the URL information, whether a security analysis result of a second application corresponding to the application download request exists in the server 200. Then, in step 404, if finding the security analysis result, the server 200 sends the security analysis result to the mobile terminal 100.

In some embodiments, the database storage unit 201 of the server 200 may store several second applications and security analysis results of the several second applications. The URL analysis unit 203 of the server 200 may provide an interface for URL matching. When the URL analysis unit receives the URL information sent by the mobile terminal 100, the URL analysis unit 203 may retrieve data stored in the database storage unit 201 for query, and send a found security analysis result to the mobile terminal 100.

In some other embodiments, if the server 200 does not find the security analysis result, existing in the server 200, of the second application corresponding to the application download request, the server 200 downloads the corresponding second application based on the URL information. After the second application is downloaded into the server 200, in the server 200, security analysis is performed on the second application and a security analysis result is recorded.

In some embodiments, if the server 200 does not find the security analysis result, existing in the server 200, of the second application corresponding to the application download request, the server 200 returns a query result to notify the mobile terminal 100 that the security analysis result is not found. The mobile terminal 100 may inform the user that the security analysis result of the second application is not found, and instruct the user to choose to perform application installation, or the core firewall component 123 of the mobile terminal 100 allows downloading the corresponding second application.

Specifically, the URL analysis unit 203 of the server 200 may retrieve the data stored in the database storage unit for query, and indicate that the second application has not been downloaded before on an entire network and has not undergone security analysis. When the corresponding security analysis result is not found, the URL analysis unit 203 directly requests, based on the URL information, to download the second application from an application server (APP_DL_Server) that provides the second application; and after the second application is successfully downloaded, a security monitoring system performs security analysis on the second application, and updates and stores the downloaded second application and a security analysis result of the second application to the database storage unit of the server 200. When the mobile terminal 100 requests to download the second application again, the server 200 may deliver the security analysis result recorded by the server 200 to the corresponding mobile terminal 100. This can ensure that a risky second application is no longer spread.

In some embodiments, the server 200 may alternatively search, based on analysis of the second application, for URL information of an alternative application that is the same or substantially the same as the second application and that has higher security and credibility, for example, a third application in the official application market. When delivering the security analysis result of the second application, the server 200 may simultaneously deliver the URL information of the alternative third application to the mobile terminal 100.

Next, in step 405, the mobile terminal 100 receives the security analysis result and determines whether to download the second application.

In some embodiments, the control guide unit 121*b* of the management module of the mobile terminal 100 receives the security analysis result, and may determine a security level of the second application based on the security analysis result. For a secure second application, the control guide unit 121*b* of the management module of the mobile terminal 100 delivers the security analysis result to the core firewall component 123 by using the policy delivery unit 121*a* and the internal control interaction interface 122*a*. The core firewall component 123 allows downloading the secure second application by using URL information, and the mobile terminal 100 may indicate prompt information that "The second application is a secure application, and downloading starts" and the like.

In some embodiments, for an insecure second application, the mobile terminal 100 informs the user of prompt information that "The second application is insecure. Please choose whether to continue downloading" and the like, and obtains operation selection input of the user. The control guide unit of the mobile terminal 100 delivers selection information of the user to the core firewall component 123*a* by using the policy delivery unit 121*a* and the internal control interaction interface 122*a*. If the user chooses to prohibit downloading, the core firewall component 123*a* prohibits the first application from downloading the insecure second application. If the user allows downloading, the core firewall component 123*a* allows the first application to download the insecure second application.

In some embodiments, for a high-risk second application, the control guide unit 121*b* directly delivers a security analysis result to the core firewall component 123 by using the policy delivery unit 121*a* and the framework layer 102. The core firewall component 123 directly prohibits downloading the high-risk second application in the first application, and the mobile terminal 100 informs the user of a message indicating that downloading the second application is prohibited because the second application is a high-risk application.

In some embodiments, if the server 200 further delivers the URL information of the alternative third application, the mobile terminal 100 may inform the user of the URL information of the third application, so that the user downloads the more secure third application.

Figure 5:
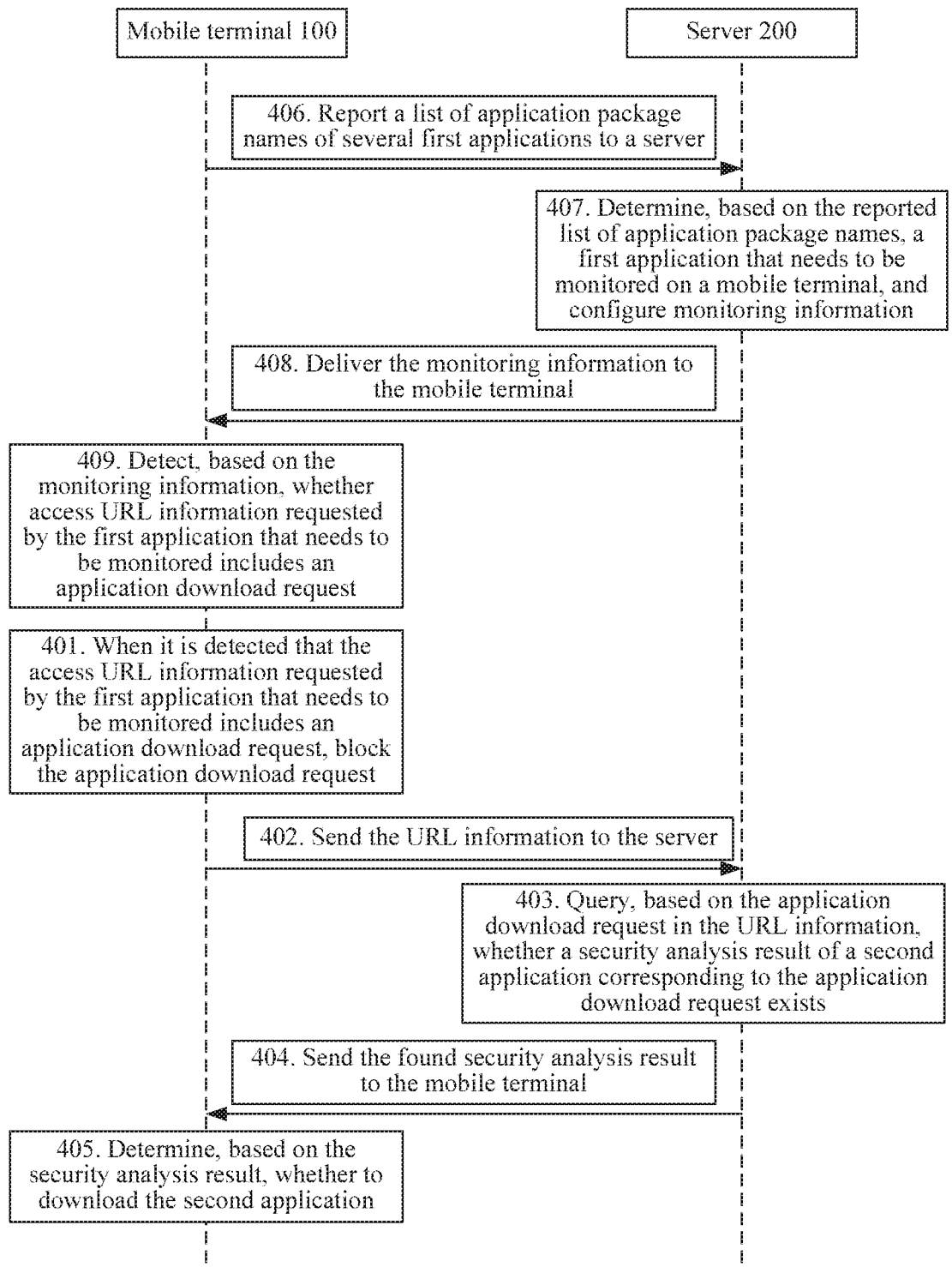
FIG. 5 is a schematic flowchart of another application download monitoring method according to an embodiment of this application.

With reference to the foregoing embodiments, in some other embodiments, the method may further include step 406 to step 409. Step 406 to step 409 are further described below with reference to FIG. 5.

In step 406, the mobile terminal 100 reports a list of application package names of several first applications to the server 200. The first application may be an application that has been installed in the system. The mobile terminal 100 may report a list of application package names of all installed applications to the server 200.

In step 407, the server 200 determines, based on the list of application package names that is reported by the mobile terminal 100, a first application that needs to be monitored on the mobile terminal 100, and configures monitoring information that includes a monitoring list of application package names of specified first applications that need to be monitored and a rule of identifying an application download request in URL information. Then, in step 408, the server 200 delivers the monitoring information to the mobile terminal 100.

In some embodiments, the policy service unit 121a of the server 200 may be responsible for configuring and delivering a monitoring policy.

There is no specified order between step 406, step 407, and step 408, and between step 406 to step 408 and other steps 401 to 405. The mobile terminal 100 may periodically perform step 406 (for example, on a weekly basis), or when a new application is installed to the mobile terminal 100, the mobile terminal 100 reports a list, of application package names of installed applications. A policy used by the mobile terminal 100 to perform step 406 may be specifically determined, and no specific limitation is set thereto. The server 200 may periodically perform step 407 and step 408 (for example, updating the monitoring policy every three days, that is, updating a control policy), and deliver the monitoring information to the mobile terminal 100. Alternatively, the monitoring information may be configured and delivered when the mobile terminal 100 reports the list of application package names.

For example, the server 200 may query for a security level of an application server of each application based on the list of application package names that is uploaded by the mobile terminal 100. An application whose security level is relatively high of an application server, for example, an application that has a relatively high level of security monitoring function, such as a Huawei mobile phone housekeeping application, may not be configured in the monitoring information. An application whose application server information is not clear or whose security level is relatively low may be configured in the monitoring information. The server 200 can improve a protection effect of the mobile terminal 100 by periodically updating and delivering monitoring information. A high-security-level result for an application may be derived from a testing result of an authoritative security testing organization. A low-security-level application may be an insecure application that has received user feedback and a complaint and that has been officially verified.

Then, in step 409, the mobile terminal 100 detects, based on the monitoring list of the application package names of the specified first applications, whether a specified first application requests access URL information, and detects whether the access URL information requested by the specified first application includes an application download request.

The mobile terminal 100 detects, based on the monitoring list of the application package names of the specified first applications, whether an application process requests access URL information. If the application process requests the access URL information, the mobile terminal 100 detects, based on the URL information identification rule, whether the access URL information requested by the first application includes an application download request.

In some embodiments, the policy delivery unit 121a of the management module 121 of the mobile terminal 100 may receive the monitoring information, and store the monitoring information in the core firewall component of the mobile terminal 100 by using the internal control interaction interface 122a. The core firewall component 123a of the mobile terminal 100 may receive network traffic of the mobile terminal 100, monitor an application process ID (User ID) of the specified first application based on the monitoring information, and detect, based on the URL information identification rule, whether an application download request exists in the application process ID. In some embodiments, for example, if URL information is a regular expression, the URL information identification rule may be as follows: When it is identified that URL information has an extension name ".apk", it is determined that an application download request exists in an application process ID.

In the prior art, in an application, when another application is requested to be downloaded, a user is only informed whether to download the application, whether the application is secure cannot be determined, and application download and installation outside the application cannot be monitored and protected. By comparison, in this embodiment of this application, the mobile terminal monitors, at an underlying layer, behavior of requesting to download a new application in all applications or some specified applications, and reports the behavior to the server to query a security analysis result of the new application, and then the mobile terminal performs corresponding protection processing on download behavior based on the security analysis result delivered by the server. In this way, it is implemented that behavior of downloading a new application in all the applications or the some specified applications is effectively monitored and protected at the underlying layer. Further, when receiving a request that is for downloading a new application and that is reported by a mobile terminal for the first time on an entire network, the server downloads, into the server, the new application from an application server based on URL information corresponding to the download request, to perform security analysis, and records a security analysis result, so as to implement that the server updates security monitoring of a network application in a timely manner, to further improve an effect of protecting application installation by the mobile terminal.

Figure 6:
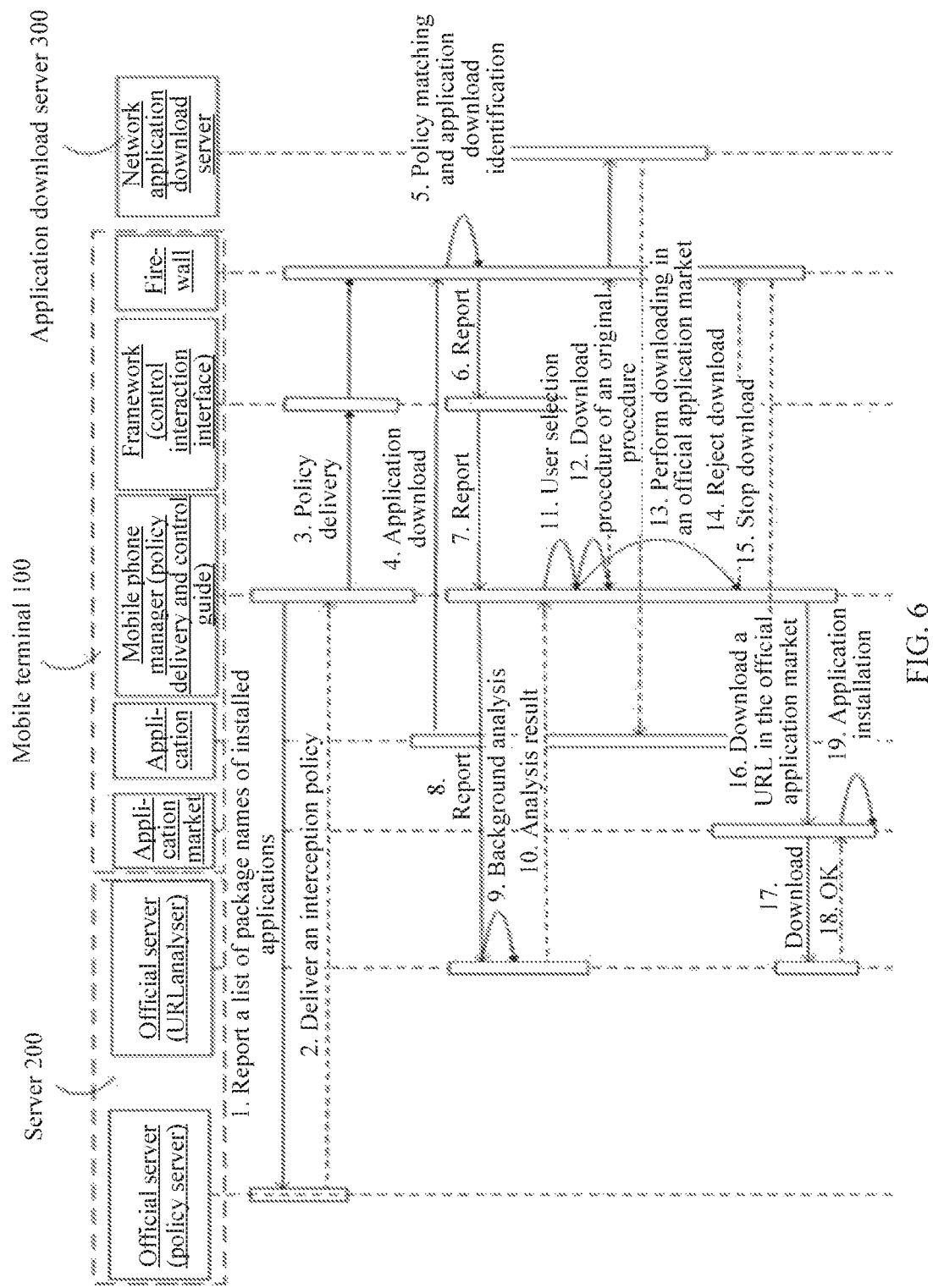
FIG. 6 is a schematic flowchart of an application download monitoring method in a possible scenario according to an embodiment of this application.

FIG. 6 is a schematic flowchart of an application download monitoring scenario in a specific embodiment of this application. An example in which a mobile terminal 100 is a mobile phone and a server 200 is an official server is used below for detailed description.

1. A mobile phone manager module reports information about a list of names of application packages installed on a mobile phone.

2. A server (official server) configures and delivers an interception policy (namely, a monitoring policy) with reference to the list of names of installed application packages.

3. The mobile phone manager module delivers, by using a framework, the interception policy to a core firewall component (namely, a firewall) of a mobile phone for configuration.

4. The mobile phone obtains a download link clicked by a user in an application.

5. The firewall performs policy matching to determine whether an access URL includes an application download request.

6. If matching succeeds, the firewall reports access URL information, and blocks the request.

7. The framework reports the matched URL information.

8. The mobile phone manager module reports the matched URL information to URL_Analyser.

9. URL_Analyser performs background matching to obtain a matching result; for a URL that needs an alternative, obtains and provides a URL address in an official application market; for a malicious application, offers an analysis result that the application is malicious; and for newly reported URL information, needs to request the URL information to download an application, perform automatic security detection on the application, and store a detection result in a database.

10. If matching succeeds, URL_Analyser determines that the download request needs to be intercepted, and returns the response result to the mobile phone.

11. The mobile phone pops up a box to instruct the user to perform an alternative download or continue downloading, and the user makes a choice.

12. When the mobile phone obtains an operation of choosing to continue downloading by the user, the mobile phone manager informs the system core firewall of the selection result, and the core firewall permits the URL request.

13. The mobile phone obtains an operation of choosing to perform download in an official application market, and the mobile phone manager switches to the official application market to download a corresponding application.

14. The mobile phone manager instructs the core firewall to reject the current URL request.

15. The core firewall informs a first application of a rejection response message.

16. The mobile phone manager switches to an application detail interface of the official application market.

17. The official application market performs an application download process.

18. The official application market performs the download process.

19. The official application market performs an application installation process.

In the foregoing process, in the download process, if recognizing that the URL is used to download an APK application installation package, the firewall at an underlying layer suspends the download, and reports the URL to the mobile phone manager by using the framework, and the mobile phone manager module reports the URL to the server. If the server does not record the URL, the server immediately returns a message to instruct the firewall at the underlying layer to continue downloading.

In addition, the server downloads the URL and analyzes a name of the application package, and searches for a same application in the application market. If the application market has a same application, the server records the application that is in the application market and that is corresponding to the URL. When the mobile terminal or another mobile terminal re-requests a download corresponding to the URL, the server may return a download address URL2 in the application market, and the mobile phone manager module may pop up a prompt for the user to determine whether to perform downloading in the application market. For example, a countdown of 10 seconds may be performed to obtain selection input.

If the mobile terminal obtains an operation input indicating that the user chooses to perform downloading in the application market, the mobile terminal delivers a command to instruct the firewall to stop downloading the application, and the mobile phone manager module sends a message to transmit the URL2 to the application market, and the application market starts the URL2 to download the application and instructs the user to install the application. If the selection input is not obtained within 10 seconds, the firewall at the underlying layer continues downloading. If the user chooses to continue downloading by using the original address, a message is immediately returned to instruct the firewall to continue downloading.

If the mobile terminal obtains operation input indicating that the user chooses to perform downloading in the application market, but the application market is not installed, the mobile phone manager module may pop up a prompt to instruct the user to install the application market. If the mobile terminal obtains operation input indicating that the user chooses to install the application market, after the corresponding application market is installed, the mobile terminal sends URL2 to the application market to download and install the application again. If operation input indicating that the user chooses not to install the application market is obtained, a download failure is indicated this time.

In some embodiments, the monitoring information configured by the server may not include application market monitoring, and therefore the firewall does not perform reporting, interception, nor control on download of a URL from the application market.

In some other embodiments, for download information, reported by the mobile terminal, of an application that is corresponding to a requested URL and that is from the application market, the server may recognize the download information, and directly return a download result, or may not pop up a prompt.

An interaction process in which the mobile terminal implements application download monitoring is further described below with reference to FIG. 3 and FIG. 7 to FIG. 13.

Figure 7:
FIG. 7 to FIG. 13 are schematic flowcharts of an application download monitoring method in a possible scenario according to an embodiment of this application.
Figure 8:
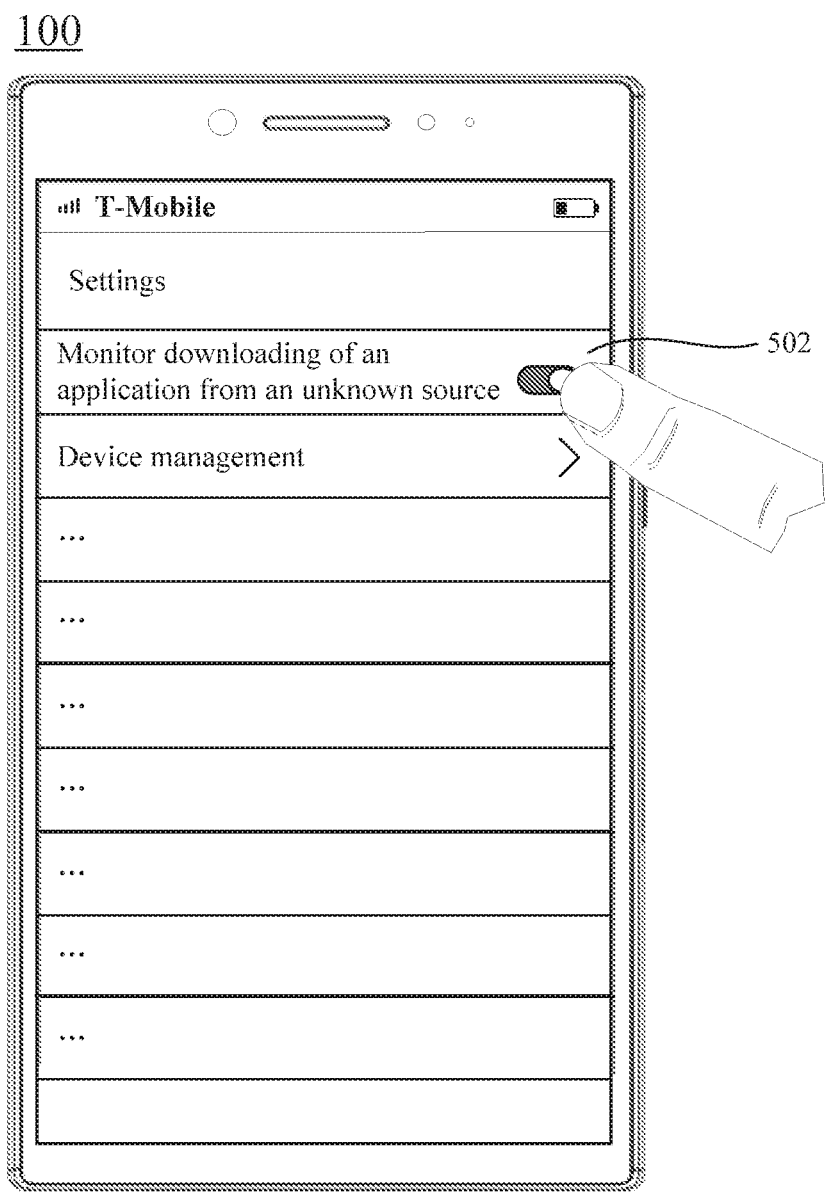

With reference to a case in FIG. 3 in which the terminal administrator user sets, by using the interface IF0, whether to start download monitoring and protection of an application from an unknown source, as shown in FIG. 7 and FIG. 8, the mobile terminal 100 obtains an operation of choosing, by the user, to enter setting 501, enters a setting screen, and on the setting screen, obtains an operation of starting monitoring, indicating that the user enables unknown-source-application download monitoring 502.

Figure 9:
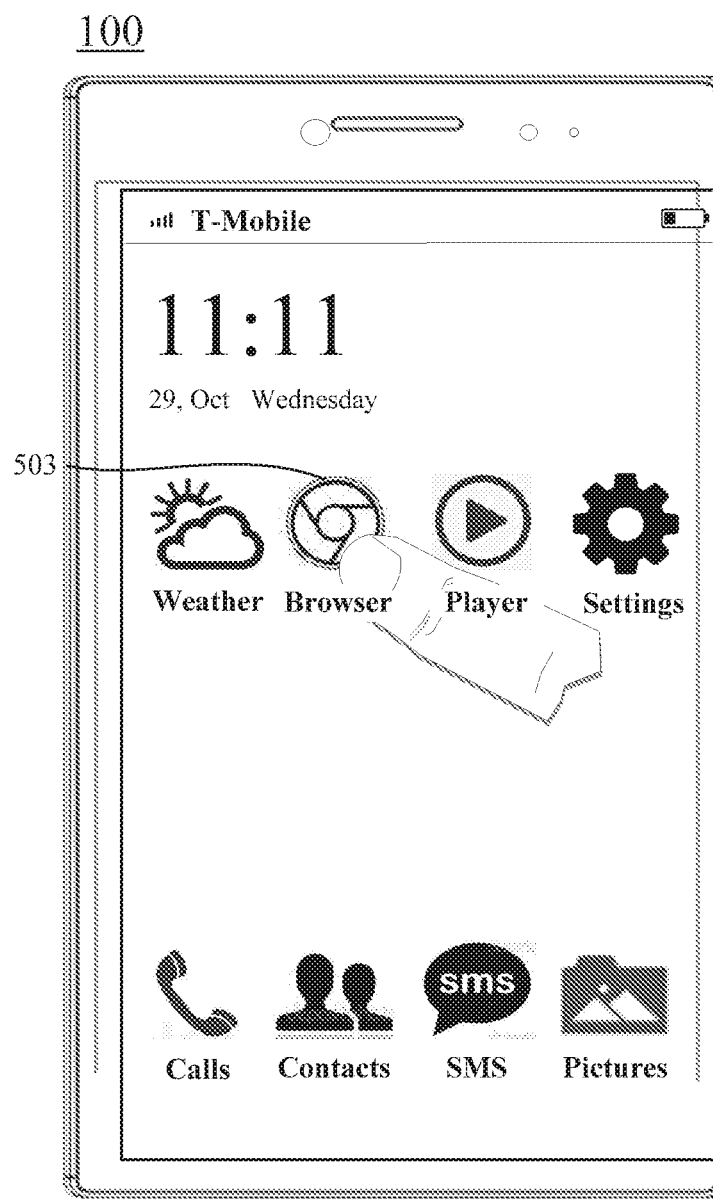
Figure 10:
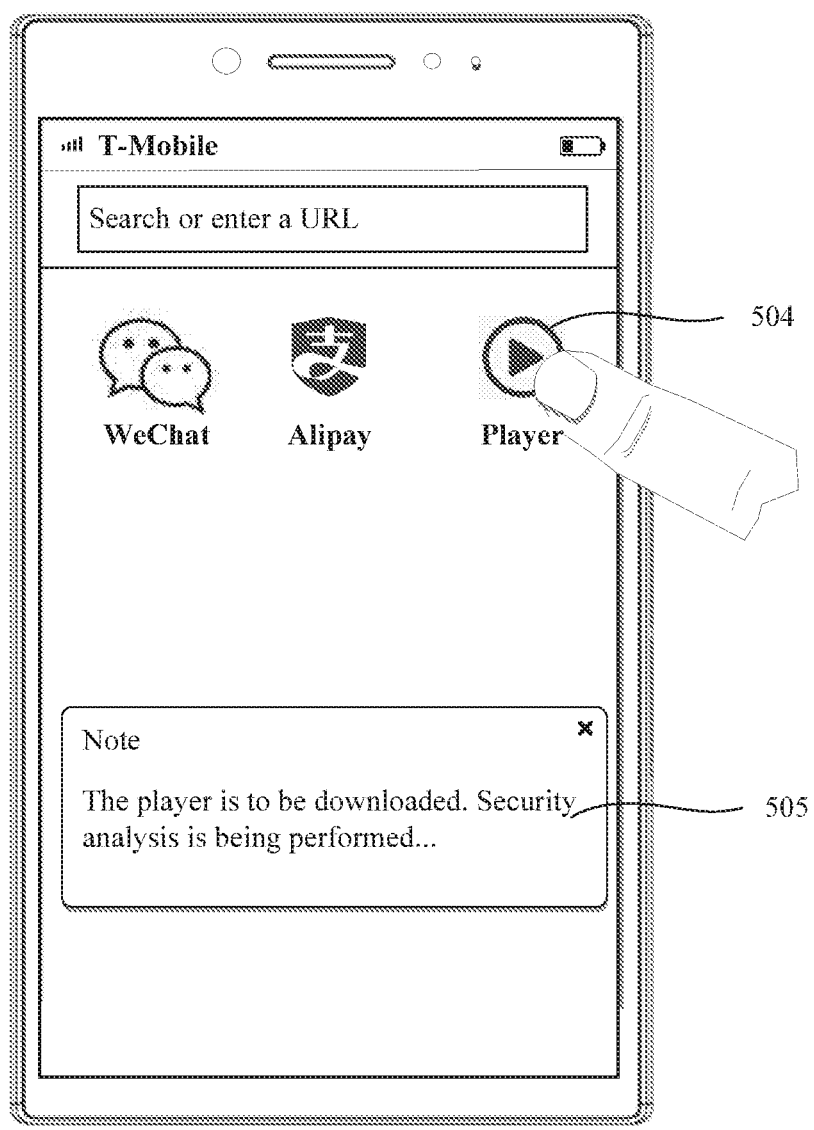
Figure 11:
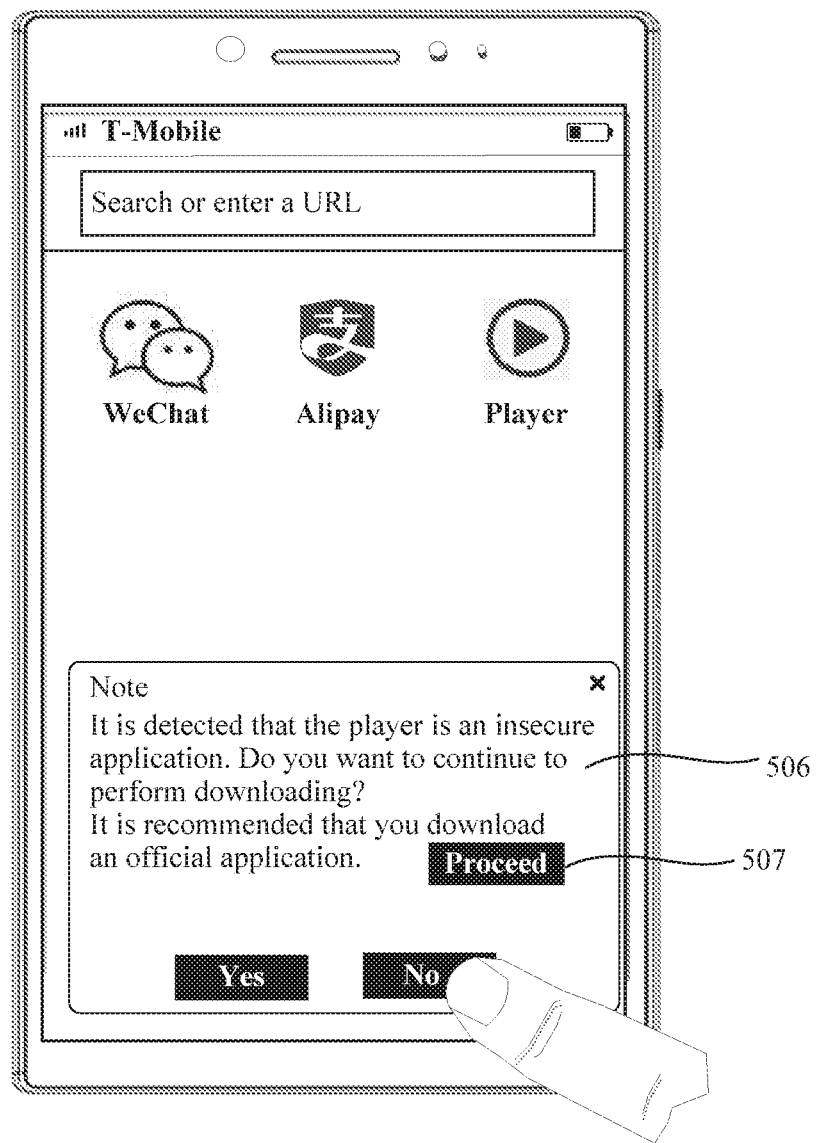
Figure 12:
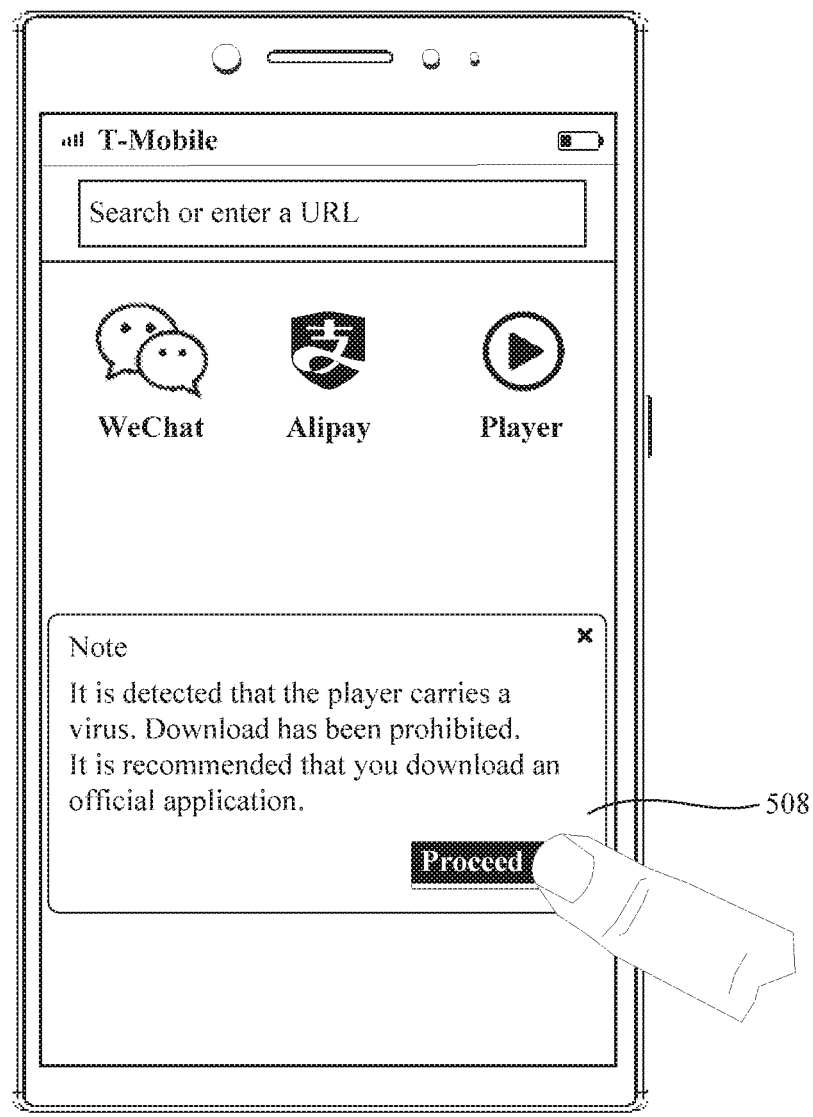
Figure 13:
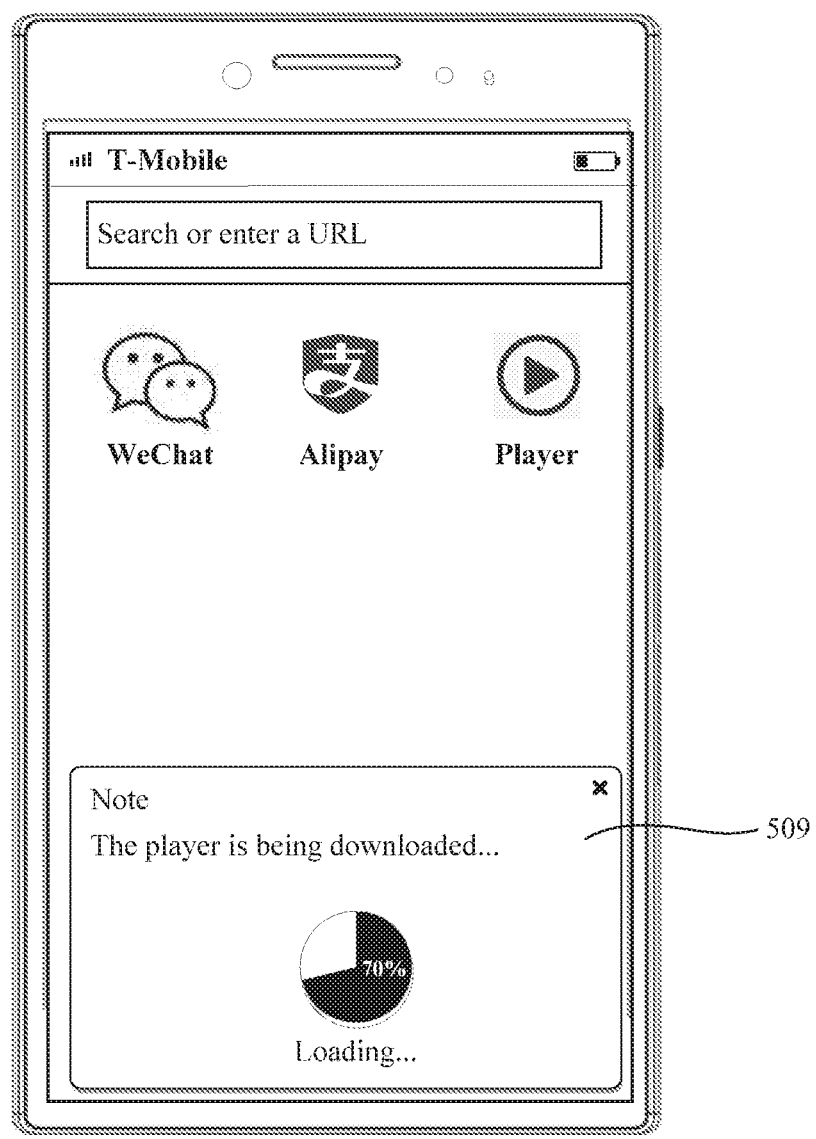

As shown in FIG. 9, when the mobile terminal 100 obtains user selection of entering a browser 503, the mobile terminal 100 displays an application interface of the browser 503. As shown in FIG. 10, after detecting an operation of choosing, by the user, to download a player 504 on the application interface of the browser 503, the mobile terminal 100 displays a prompt screen 505 indicating that "The player is to be downloaded. Security analysis is being performed". The mobile terminal 100 sends, to the server 200 and in the background, requested URL information for uploading the player. As shown in FIG. 11, after obtaining a security analysis result returned by the server 200, if determining that the player is an insecure application, that is, an application having a security risk, the mobile terminal 100 displays a prompt screen 506 indicating that "It is detected that the player is an insecure application. Do you want to continue to perform downloading?", for the user to choose to whether to continue downloading. The mobile terminal 100 may also provide an option 507 of downloading an official application on the prompt screen 506. As shown in FIG. 12, if determining that the player is a high-risk application, for example, carrying a virus, the mobile terminal 100 displays a prompt screen 508 indicating that "Download has been prohibited". The mobile terminal 100 prohibits downloading the player application in the core firewall component 123 at the underlying layer. The mobile terminal 100 may also provide an option of downloading the official application in the popped-up prompt screen 508, and perform downloading based on an operation of selecting the download option by the user. As shown in FIG. 13, if the mobile terminal 100 determines that the player is a secure application, the mobile terminal 100 may allow downloading the player and pops up a prompt screen 509 indicating, for example, "The player is being downloaded . . . ".

Therefore, the mobile terminal 100 can enable, based on user selection, a function of download monitoring and protection of an application from unknown source. After on the function is enabled, the monitoring process is not limited to application download security monitoring provided by a specific application party, instead, the mobile terminal 100 can provide an application download protection mechanism of a system level. When there is a source-application download request, the mobile terminal 100 can choose to prohibit downloading, allow downloading, or determine, based on user selection, whether to perform downloading. Therefore, while a protection effect is improved, an interaction process is visible to the user, and therefore provides a friendly screen and achieves good usability.

All or some of the foregoing embodiments may be implemented in software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions based on the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device such as a server or a data center that includes one or more usable media. The usable medium may be a magnetic medium (for example, a floppy disk, a hard disk, or a magnetic tape), an optical medium (for example, DVD), a semiconductor medium (for example, a solid state disk (SSD)), or the like.

In the embodiments of this application, functional module division may be performed on the device based on the foregoing examples in the method. For example, various functional modules may be divided based on various corresponding functions, or two or more functions may be integrated into one processing module. The integrated module may be implemented in a form of hardware, or may be implemented in a form of a software functional module. The module division in the embodiments of this application is an example, and is merely logical function division. There may be another division manner in actual implementation.

It may be clearly understood by a person skilled in the art that for the purpose of convenient and brief description, division of the foregoing functional modules is only an example. In actual application, the foregoing functions may be allocated to different functional modules depending on a requirement, that is, an inner structure of a mobile device is divided into different functional modules to implement all or some of the functions described above. For a detailed working process of the foregoing system, mobile device, and unit, refer to a corresponding process in the foregoing method embodiments. Details are not repeated herein.

In conclusion, the foregoing embodiments are merely intended to describe the technical solutions of this application, but not to limit this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A mobile terminal for implementing application download monitoring, comprising:
   a memory comprising instructions; and
   a processor coupled to the memory and configured to execute the instructions to cause the mobile terminal to be configured to:
     send a first list of application package names of applications installed at the mobile terminal to a server;
     receive monitoring information from the server, wherein the monitoring information comprises a second list of the application package names of a plurality of first applications that are to be monitored and a rule for identifying requests to download applications in URL information, and wherein the rule indicates a Universal Resource Locator (URL) expression extension to identify the requests to download applications;
     detect, based on the monitoring information and the URL expression extension indicated by the rule, whether access URL information requested by the plurality of first applications comprises an application download request that requests to download a second application;
     block the application download request in response to detecting that first access URL information requested by one of the plurality of first applications comprises the application download request to download the second application;
     send the first access URL information comprising the application download request, to the server;
     receive a security analysis result of the second application from the server;
     determine, based on the security analysis result, whether to download the second application;
     further receive from the server, when the security analysis result of the second application indicates a security risk, first URL information to download a third application; and
     provide a choice to a user to perform an alternative download of the third application or to continue downloading the second application.

2. The mobile terminal of claim 1, wherein the instructions further cause the mobile terminal to be configured to:
   detect, based on the second list of the application package names of the plurality of first applications that are to be monitored, whether the one of the plurality of first applications requests the access URL information; and
   detect, according to the rule, whether the first access URL information requested by the one of the plurality of first applications comprises the application download request.

3. The mobile terminal of claim 2, wherein the instructions further cause the mobile terminal to be configured to determine, based on the security analysis result, that the second application should be prohibited from being downloaded.

4. The mobile terminal of claim 2, wherein the instructions further cause the mobile terminal to be configured to determine, based on selection input of the user, whether to download the second application.

5. The mobile terminal of claim 2, wherein the instructions further cause the mobile terminal to be configured to determine that the second application is allowed to be directly downloaded.

6. The mobile terminal of claim 2, wherein the instructions further cause the mobile terminal to be configured to:
receive network traffic of the mobile terminal; and
monitor an application process ID or name of the one of the plurality of first applications based on the monitoring information,
wherein the application download request is detected in the first access URL information when detecting the application process ID comprising a first URL expression extension that has an extension name ".apk".

7. The mobile terminal of claim 1, wherein the instructions further cause the mobile terminal to be configured to determine, based on the security analysis result, that the second application should be prohibited from being downloaded.

8. The mobile terminal of claim 7, further comprising a touchscreen coupled to the processor, wherein the instructions further cause the mobile terminal to be configured to:
cause the touchscreen to display a prompt screen for selection by the user;
obtain a selection operation of the user; and
determine, based on the selection operation, whether to prohibit or allow the second application to be downloaded.

9. The mobile terminal of claim 8, wherein, after determining that the second application should be prohibited from being downloaded, the instructions further cause the mobile terminal to be configured to:
cause the touchscreen to display a prompt screen indicating that downloading the second application has been prohibited;
cause the touchscreen to display download information of the third application related to the second application;
obtain a download operation selected by the user based on the download information of the third application; and
download the third application.

10. The mobile terminal of claim 7, further comprising a touchscreen coupled to the processor, wherein, in response to determining that the second application should be prohibited from being downloaded, the instructions further cause the mobile terminal to be configured to:
cause the touchscreen to display a prompt screen indicating that downloading the second application has been prohibited;
cause the touchscreen to display download information of the third application related to the second application;
obtain a download operation selected by the user based on the download information of the third application; and
download the third application.

11. The mobile terminal of claim 1, wherein the instructions further cause the mobile terminal to be configured to determine, based on the security analysis result, that the second application should be prohibited from being downloaded.

12. The mobile terminal of claim 1, wherein the instructions further cause the mobile terminal to be configured to determine, based on selection input of the user, whether to download the second application.

13. The mobile terminal of claim 1, wherein the instructions further cause the mobile terminal to be configured to determine that the second application is allowed to be directly downloaded.

14. The mobile terminal of claim 1, wherein the instructions further cause the mobile terminal to be configured to determine that the second application is allowed to be directly downloaded.

15. A server for implementing application download monitoring, comprising:
a memory comprising instructions; and
a processor coupled to the memory and configured to execute the instructions to cause the server to be configured to:
receive a first list of application package names of applications installed at a mobile terminal from the mobile terminal;
configure monitoring information based on the first list of the application package names, wherein the monitoring information comprises a second list of application package names a plurality of first applications that are to be monitored and a rule for identifying requests to download applications in Universal Resource Locator (URL) information, and wherein the rule indicates a URL expression extension to identify at the mobile terminal the requests to download applications;
send the monitoring information to the mobile terminal;
receive access URL information from the mobile terminal, wherein the access URL information is requested by one of the plurality of first applications executing on the mobile terminal, and wherein the access URL information comprises an application download request that requests to download a second application;
determine, based on the application download request in the access URL information, whether a security analysis result of the second application exists in the server;
send the security analysis result to the mobile terminal in response to the security analysis result of the second application existing in the server; and
further send to the mobile terminal, when the security analysis result of the second application indicates a security risk, first URL information to download a third application.

16. The server of claim 15, wherein, in response to the security analysis result of the second application not existing in the server, the instructions further cause the server to be configured to:
request to download the second application based on the access URL information;
perform security analysis on the second application after downloading the second application; and
record the security analysis result.

17. The server of claim 16, wherein, in response to the security analysis result of the second application not existing in the server, the instructions further cause the server to notify the mobile terminal that downloading the second application is allowed.

18. The server of claim 15, wherein, in response to the security analysis result of the second application not existing in the server, the instructions further cause the processor to be configured to notify the mobile terminal that downloading the second application is allowed.

19. The server of claim 15, wherein the monitoring information comprises a name of a to-be-monitored Android application package (APK) and a to-be-accessed URL.

20. A computer program product comprising computer-executable instructions stored on a non-transitory computer-readable medium that, when executed by a processor, cause a mobile terminal to:
send a first list of application package names of applications installed at the mobile terminal to a server;

receive monitoring information from the server, wherein the monitoring information comprises a second list of the application package names of a plurality of first applications that are to be monitored and a rule for identifying requests to download applications in URL information, and wherein the rule indicates a Universal Resource Locator (URL) expression extension to identify the requests to download applications;

detect, based on the monitoring information and the URL expression extension indicated by the rule, whether access URL information requested by the plurality of first applications comprises an application download request that requests to download a second application;

block the application download request in response to detecting that first access URL information requested by one of the plurality of first applications comprises the application download request to download the second application;

send the first access URL information comprising the application download request, to the server;

receive a security analysis result of the second application from the server;

determine, based on the security analysis result, whether to download the second application;

further receive from the server, when the security analysis result of the second application indicates a security risk, first URL information to download a third application; and provide a choice to a user to perform an alternative download of the third application or to continue downloading the second application.

* * * * *